(12) United States Patent
Yokoo et al.

(10) Patent No.: US 7,958,752 B2
(45) Date of Patent: Jun. 14, 2011

(54) METHOD AND APPARATUS FOR DISTRIBUTING FIBROUS MATERIAL

(75) Inventors: Yuji Yokoo, Chiyoda-ku (JP); Susumu Tsurumaki, Chiyoda-ku (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 810 days.

(21) Appl. No.: 11/761,135

(22) Filed: Jun. 11, 2007

(65) Prior Publication Data

US 2007/0289335 A1 Dec. 20, 2007

(30) Foreign Application Priority Data

Jun. 15, 2006 (JP) .................................. 2006-166054

(51) Int. Cl.
 *C03B 37/06* (2006.01)
(52) U.S. Cl. ................ 65/458; 65/470; 65/505; 65/521; 65/526
(58) Field of Classification Search ..................... 65/455, 65/458, 470, 505, 521, 526
See application file for complete search history.

(56) References Cited

U.S. PATENT DOCUMENTS

| | | |
|---|---|---|
| 4,061,485 A | 12/1977 | Rimmel |
| 4,266,960 A | 5/1981 | Scott et al. |
| 4,300,931 A | 11/1981 | Phillips |
| 6,776,013 B2 | 8/2004 | Butler |
| 2004/0083764 A1 | 5/2004 | Butler |
| 2007/0278706 A1* | 12/2007 | Cretors et al. ................... 264/8 |

FOREIGN PATENT DOCUMENTS

| | | |
|---|---|---|
| EP | 0 118 369 A1 | 9/1984 |
| JP | 57-500588 | 4/1982 |
| JP | 59-7652 | 2/1984 |
| JP | 8-13307 | 1/1996 |
| WO | WO 81/03017 | 10/1981 |
| WO | WO 99/27206 | 6/1999 |
| WO | WO 02/055782 A2 | 7/2002 |
| WO | WO 2004/041736 A1 | 5/2004 |

* cited by examiner

*Primary Examiner* — Queenie Dehghan
(74) *Attorney, Agent, or Firm* — Oblon, Spivak, McClelland, Maier & Neustadt, L.L.P.

(57) ABSTRACT

A method for distributing fibrous material, wherein fibrous material, which is fiberized by a spinner of a fiberizing unit, is accumulated on a collection conveyor disposed under the spinner, is characterized by rotatably disposing a hollow cylindrical bucket at a position just under the spinner, the hollow cylindrical bucket having a two-stage structure comprising an upper stage part and a lower stage part, the lower stage part being inclined at an angle with respect to a rotary axis of the hollow cylindrical bucket; and rotating the hollow cylindrical bucket, dispersing the fibrous material in the hollow cylindrical bucket and accumulating the fibrous material on the collection conveyor after flowing down the fibrous material in the hollow cylindrical bucket.

11 Claims, 3 Drawing Sheets

METHOD AND APPARATUS FOR DISTRIBUTING FIBROUS MATERIAL

The present invention relates to a method and an apparatus for distributing fibrous material when the fibrous material is collected to produce a fibrous product for, e.g., a thermal insulation product or an acoustical insulation product. In particular, the present invention relates to a method and an apparatus for distributing short glass fibers (glass wool) such that the short glass fibers are controllably dispersed in a uniform and constant thickness.

Inorganic fibrous products, in particular products made of glass fibers, are representatively made of continuous fibers (continuous glass fibers) or discontinuous fibers (short glass fibers). Among them, discontinuous fibers are generally used for a thermal insulation product. In this case, in order to form fiberized discontinuous fibers in a certain shape, a resin as a binder is applied to the discontinuous fibers to make the discontinuous fibers into a mat product, a plate product or a roll product, followed by partly or entirely coating, e.g., a facing on such a product according to applications. These products are utilized as thermal insulation products for houses or general construction. An example of the other applications of the discontinuous fibers is an acoustical insulation product. Since finely fiberized discontinuous fibers effectively absorb a noise in the fibrous space made thereof, the finely fiberized discontinuous fibers can have an excellent advantage in noise suppression by being used in a wall surface for, e.g., various buildings or roads.

In order to use discontinuous fibers to produce such a thermal insulation product or an acoustical insulation product, it is important to uniformly distribute fiberized discontinuous fibers. As the method for uniformly distributing short glass fibers, there has been known a method for dispersing and collecting short glass fibers on a collection conveyor by applying blasts of compressed air to short glass fibers fiberized by a fiberizing unit (spinner) (see JP-B-59-7652 and JP-A-57-500558).

This method uses compressed air to uniformly disperse short glass fibers (hereinbelow, also referred to as fibers) in a width direction of an accumulation conveyor 7 as shown in FIG. 4. Specifically, the fibers fiberized by the spinner 1 of a fiberizing unit are flowed down in a bucket 2 and are dispersed with a resin by a binder applicator 3, followed by being flowed down as trajectories of fibers 5 in a collection zone 11 (hereinbelow, referred to as the hood). In this method, air blasting units 4 are disposed to confront each other in a width direction of the accumulation conveyor 7, such that the fibers are collected, being swung and dispersed in the width direction of the accumulation conveyor, by blowing off compressed air to fibers alternately from both sides of fibers just after the fibers have passed through the binder applicator 3.

This method has caused a problem in that fibers are stirred up in the hood 11 for collecting fibers in a certain thickness since a large amount of compressed air is used to disperse the fibers. This method has caused another problem in that when fibers are violently stirred up, and when clusters of fibers are formed in the hood since the resin, which has been applied as the binder to the fibers as stated above, has viscosity and adhesiveness, clusters of fibers drop into a product to make the product defective. In order to prevent clusters of fibers from being formed, it is necessary to periodically clean the inside of the hood. In order to restrain fibers from being stirred up, it is necessary to make the fiber collecting apparatus larger. However, when the fiber collecting apparatus is made larger, the amount of exhaust gas increases, and huge energy is needed to clean up the exhaust gas. Although an attempt is made to increase the suction amount of the collection conveyor in order to restrain the stirring-up of fibers, huge energy is also needed since used power increases. The stirring-up of fibers means a phenomenon that when fibers are collected on a conveyor, there are groups of fibers, which are scattering in the space in the hood without being accumulated on the conveyor.

As the measures that copes with a case where clusters of fibers are formed in the hood as stated above, there has been disclosed in JP-A-8-13307 a method for preventing clusters of fibers from dropping by removing the clusters of fibers. This method is one, which produces a glass wool mat having nonuniformity in binder application and nonuniformity in fiber density minimized by using a rotating belt to continuously remove clusters of fibers adhering to an upper portion of the side wall of the hood before the clusters of fibers drop. However, such a method is not a fundamental solution to the formation of clusters of fibers since the method solves the problem by merely removing formed clusters of fibers after formation, not by restraining the stirring-up of fibers in order to avoid the formation of clusters of fibers.

WO-A-2004-041736 has disclosed a method wherein a bucket has both lateral sides supported by a rotary shaft extending in the same direction as a collection conveyor under a fiberizing unit, and wherein glass fibers are swung and collected on the collection conveyor by swinging the bucket in a direction perpendicular to the conveying direction of the collection conveyor while short glass fibers, which have been fiberized, are flowing down through the bucket. However, there is a possibility that this method cannot uniformly distribute glass fibers in the entire width of the collection conveyor since the method is poor at dispersiveness of fibers because of merely swinging the bucket. Further, this method has caused another problem in that the frequency of mechanical failure increases because of the fiber distribution apparatus per se being made large.

It is an object of the present invention to provide a method for uniformly distributing fiberized fibrous material on a fiber accumulation conveyor without using compressed air or forming clusters of fibers, and a distribution apparatus therefor.

The inventors have investigated methods for distributing fiberized fibrous material in order to attain the above-mentioned object. As the results of the investigation, the inventors have proposed the present invention by fining that when a hollow cylindrical bucket, which is rotating, is disposed under a spinner so that a lower portion of the bucket is inclined at an angle with respect to the rotary axis of the bucket, fibrous material, which is flowing down through the hollow cylindrical bucket, can be accumulated on a collection conveyor, being more uniformly dispersed than before by using the effects of a centrifugal force and a resistance given by the bucket without using compressed air.

The present invention provides a method for distributing fibrous material, wherein fibrous material, which is fiberized by a spinner of a fiberizing unit, is accumulated on a collection conveyor disposed under the spinner, comprising rotatably disposing a hollow cylindrical bucket at a position just under the spinner, the hollow cylindrical bucket having a two-stage structure comprising an upper stage part and a lower stage part, the lower stage part being inclined at an angle with respect to a rotary axis of the hollow cylindrical bucket; and rotating the hollow cylindrical bucket, dispersing the fibrous material in the hollow cylindrical bucket and accumulating the fibrous material on the collection conveyor after flowing down the fibrous material in the hollow cylindrical bucket.

In the distribution method according to the present invention, it is preferred that the fibrous material comprise glass wool (short glass fibers).

In the distribution method according to the present invention, it is preferred that the lower stage part of the hollow cylindrical bucket be inclined at an angle of 5° to 45° with respect to the rotary axis, and that the upper stage part have an outer periphery expanding toward an upper end thereof, and the lower stage part has an outer periphery formed in a tapered shape.

In the distribution method according to the present invention, it is preferred that the lower stage part of the hollow cylindrical bucket have an upper end formed to have a diameter at least equal to the diameter of the spinner.

In the distribution method according to the present invention, it is preferred that the hollow cylindrical bucket and the spinner have a ring-shaped member therebetween.

In the distribution method according to the present invention, it is preferred that the hollow cylindrical bucket have a rotating speed of 10 to 120 rpm.

The present invention also provides an apparatus for distributing fibrous material, wherein fibrous material, which is fiberized by a spinner of a fiberizing unit, is accumulated on a collection conveyor disposed under the spinner, comprising a hollow cylindrical bucket rotatably disposed at a position just under the spinner, the hollow cylindrical bucket comprising two stages of an upper stage part and a lower stage part, the lower stage part being inclined at an angle with respect to a rotary axis of the hollow cylindrical bucket;

whereby the hollow cylindrical bucket is rotated to disperse the fibrous material in the hollow cylindrical bucket and is accumulated on the collection conveyor after the fibrous material has flowed down in the hollow cylindrical bucket.

In accordance with the present invention, the fibrous material, which has been fiberized as stated above, is uniformly dispersed by the effects of a centrifugal force and a resistance given by the rotating hollow cylindrical bucket and is accumulated on the collection conveyor. Since no compressed air is used for controllably distributing the fibrous material unlike the conventional methods and apparatuses, it is possible to decrease the amount of an exhaust gas in the apparatus for distributing the fibrous material. Thus, it is possible to reduce the costs required for the facility for dealing with the exhaust gas and the process for cleaning up the exhaust gas.

Since the fibrous material is controllably distributed by the rotating hollow cylindrical bucket, it is possible not only to improve the uniformity in collection of fibers but also to avoid a case where clusters of fibers, which adhere to a hood when fibers are stirred up by a compressed air, are formed. Accordingly, it is possible to prevent clusters of fibers from being contained accumulated fibrous material and to obtain a high quality product having nonuniformity in binder application and nonuniformity in fiber density minimized.

In the present invention, the fibrous material to be distributed mainly comprises inorganic fibers, which are useful as a thermal insulation product or an acoustical insulation product, specifically inorganic fibers having excellent heat resistance and excellent weatherability, such as glass wool (short glass fibers) and rock wool. Among them, the present invention is favorably applicable to glass wool, which can be produced at a low cost and has an excellent heat insulation performance. Various kinds of products, such as a mat product, a plate product or a roll product, can be made of such glass wool by using a known producing and processing method.

The above-mentioned fibrous material is fiberized by the spinner of a fiberizing unit. The present invention relates to a method and an apparatus wherein the fibrous material thus fiberized is accumulated on a collection conveyor, and which are characterized in that the fibrous material is uniformly dispersed by the effects of a centrifugal force and a resistance caused by a rotating hollow cylindrical bucket without using compressed air for distributing the fibrous material.

Figure 1:
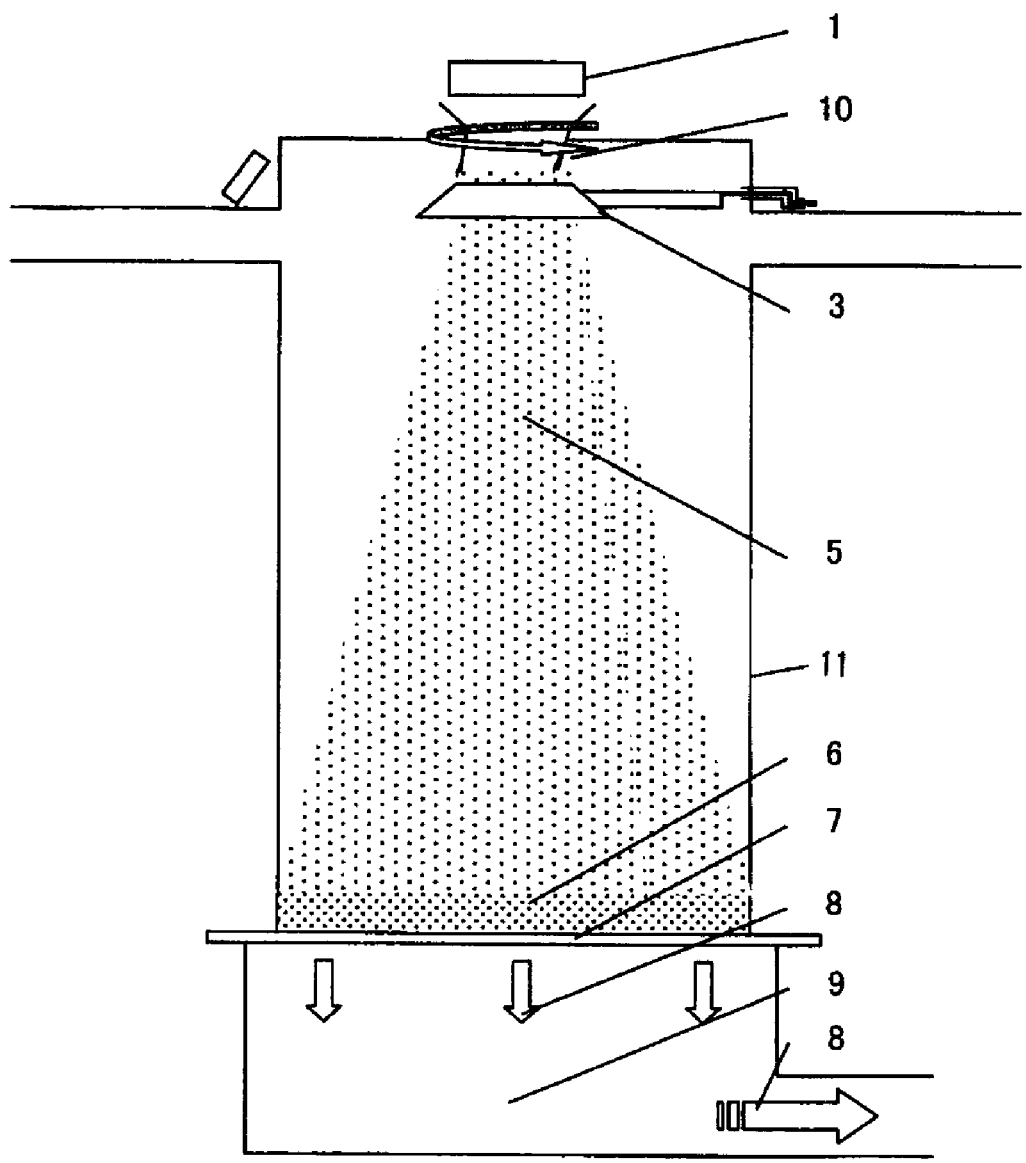
FIG. 1 is a schematic cross-sectional view of the distribution apparatus for glass wool according to a preferred embodiment of the present invention.

Now, the present invention will be specifically described based on the accompanying drawings. The figures that will be described below show an example of the glass wool distribution apparatus as a preferred embodiment of the present invention. The present invention is not limited to this example. FIG. 1 is a schematic cross-sectional view showing the entire apparatus about the process from glass wool fiberization to glass wool accumulation. As shown in FIG. 1, glass wool, which has been fiberized by a spinner 1, flows down in a hollow cylindrical bucket 10 disposed at a portion just under the spinner 1, is dispersed, being subjected to a resistance caused by rotation of the hollow cylindrical bucket 10, and flows down as fiber flows (veil) in a hood 11. Then, the glass wool is accumulated on a collection conveyor 7 disposed under the spinner 1 and is formed into a mat of fibers 6. The trajectories of the fiber flows in that time are indicated by reference numeral 5. A binder applicator 3, which is disposed under the hollow cylindrical bucket 10, disperses a solution containing, e.g., a phenol-formaldehyde resin as a binder to apply the binder to the glass wool, which has been dispersed by the hollow cylindrical bucket 10. The collection conveyor 7 is disposed in the proximity of the lower end of the hood 11 under the spinner 1 and is driven at a constant speed in a direction perpendicular to the drawing sheet. The collection conveyor 7 has an air-permeable structure and has a lower portion provided with an exhaust gas collection box 9 so that a gas, such a combustion exhaust gas or air, in the hood 11 is sucked through the mat of fibers 6 and is discharged as an exhaust gas 8. Although the discharged exhaust gas 8 is cleaned up, the amount of the exhaust gas to be cleaned is smaller than before since the glass wool has not been dispersed by compressed air as in conventional distribution methods and apparatuses.

The above-mentioned process is substantially the same as commonly implemented techniques for producing glass wool or a glass wool mat except that glass wool is dispersed by the hollow cylindrical bucket 10. For this reason, a conventional technique or apparatus may be properly used except for the hollow cylindrical bucket 10. For example, the spinner 1 may be disposed at a single location or at each of plural locations along the conveying direction of the collection conveyor 7. In other words, in, e.g., a case where it is necessary to increase the thickness of the mat of fibers, a case where it is necessary to equalize the quality by laminating multilayered pieces of glass wool, or a case where it is necessary to laminate pieces of glass wool having different fiber diameters or different physical properties, the mat of fibers 6 can be formed in a desired structure by disposing, e.g., two to ten spinners above the collection conveyor along the conveying direction so as to comply with a desired purpose and by sequentially laminating pieces of glass wool fiberized by the spinners onto the collection conveyor 7 advancing at a constant speed from the upstream spinner and its subsequent downstream spinners in this order. It should be noted that the basic techniques for fiberization by a spinner and collection of dispersed fibrous material with respect to such a mat of fibers are also substantially applicable to other inorganic fibers.

Figure 2:
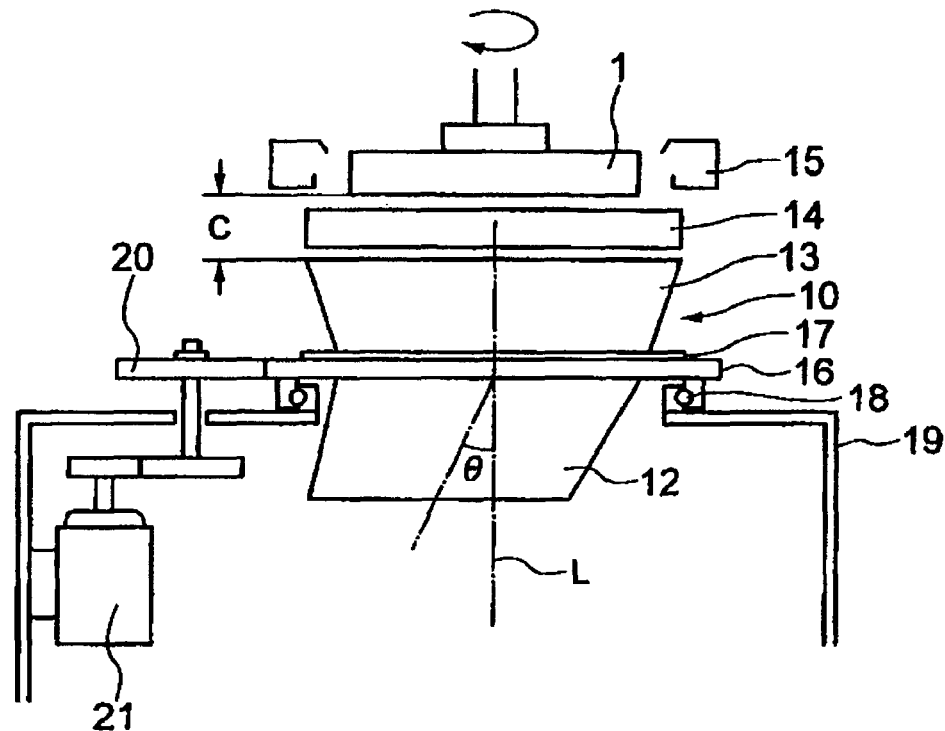
FIG. 2 is an enlarged view showing a portion for mounting the hollow cylindrical bucket shown in FIG. 1.
Figure 3:
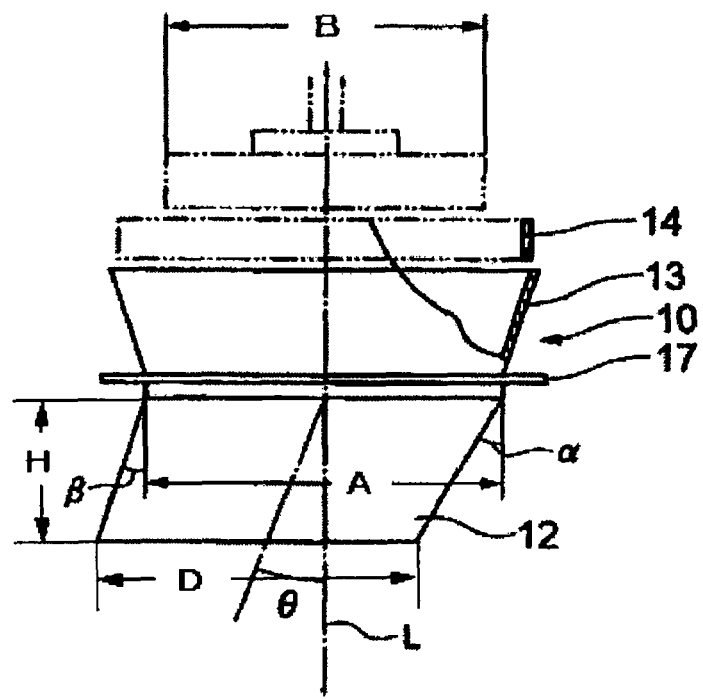
FIG. 3 is an enlarged view showing the hollow cylindrical bucket shown in FIG. 1.
Figure 4:
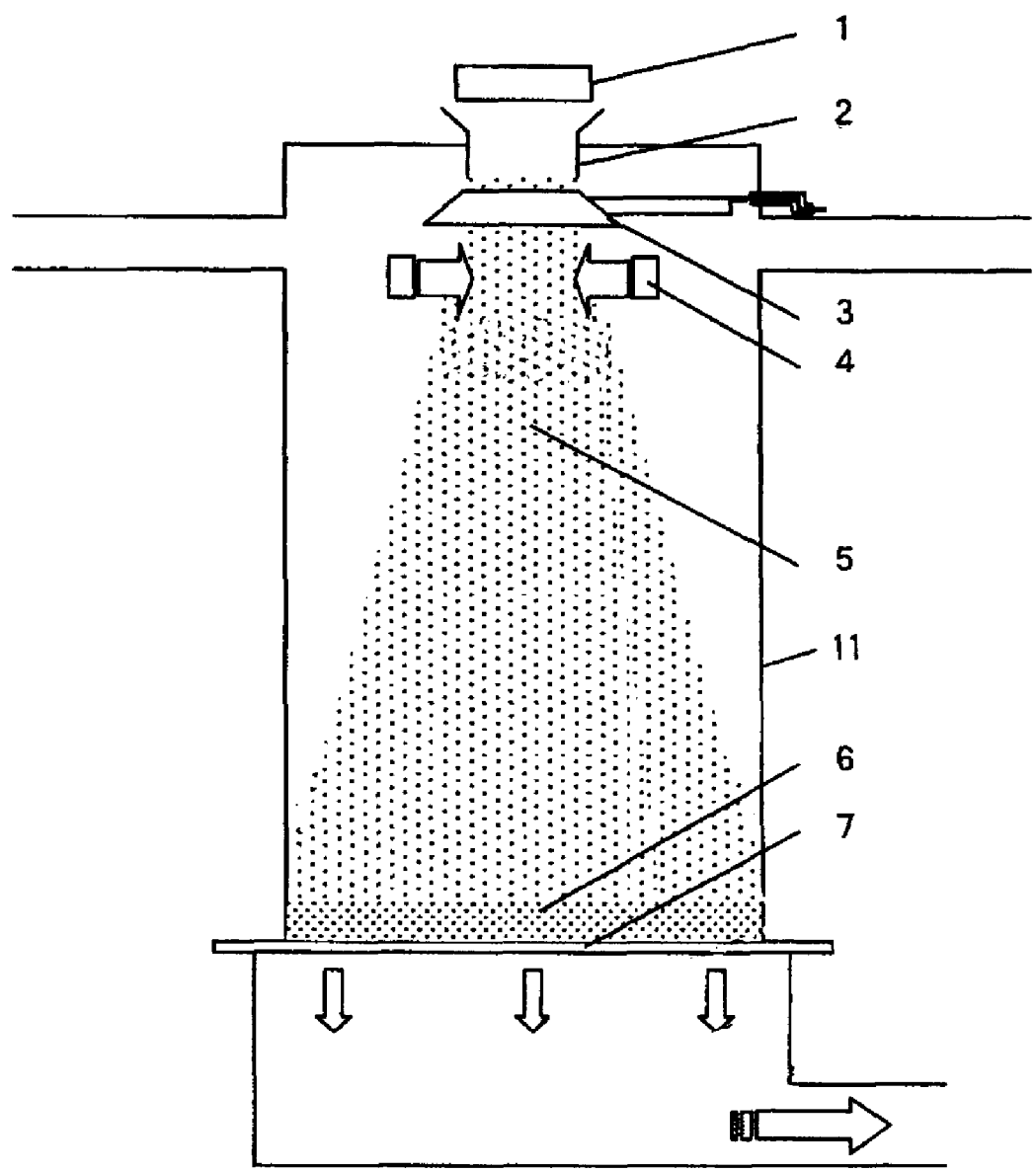
FIG. 4 is a schematic cross-sectional view of a conventional distribution apparatus for glass wool.

Next, the hollow cylindrical bucket 10 will be explained. FIG. 2 is an enlarged view of the hollow cylindrical bucket 10 as shown in FIG. 1 and its vicinity. FIG. 3 is an enlarged view of the hollow cylindrical bucket 10. As shown in FIG. 3, the hollow cylindrical bucket 10 comprises a rotatable body as a whole, which has a top end and a bottom end open, is formed in a substantially circular shape in section, is made of, e.g., a steel plate and has a two stage structure comprising an upper stage part 13 and a lower stage part 12. The upper stage part 13 and the lower stage part 12 have a mounting flange 17 properly disposed at a connection part therebetween so as to rotatably mount the hollow cylindrical bucket 10 as stated later. The upper stage part 13 has an outer periphery inclined at a uniform angle around a rotary axis L to expand toward an upper end so as to easily receive glass wool fiberized by the spinner 1. Although the hollow cylindrical bucket 10 according to this embodiment includes an uninclined portion at a lower end of the upper stage part 13 where the mounting flange 17 is located, this uninclined portion is disposed in terms of structural necessity so that a gear 16, which will be stated later, can be easily attached to the mounting flange 17.

In the hollow cylindrical bucket 10, the lower stage part 12 is inclined an angle $\theta$ with respect to the rotary axis L. It is preferred that the outer periphery of the lower stage part 12, which is inclined with respect to the rotary axis L stated above, be formed in such a tapered shape that the opening area gradually decreases toward a lower end. When the lower stage part 12 is formed in such a tapered shape, the resistance of glass wool accelerated in the lower stage part by a centrifugal force caused by rotation of the hollow cylindrical bucket 10 can be balanced with the centrifugal force to effectively disperse the glass wool in uniform fashion. Further, when the lower stage part 12 is formed in such a tapered shape, it is possible to improve the uniformity of the glass fibers flowing down in the hollow cylindrical bucket, and it is also possible to obtain, e.g. an effect of improving the uniformity of a fiber mat plate so as to minimize the variation in density. It should be noted that the resistance given to glass wool by the hollow cylindrical bucket 10 means an air resistance applied to glass wool in the hollow cylindrical bucket 10 when the glass wool flows down, being accelerated in the hollow cylindrical bucket 10. For this reason, both the centrifugal force and the resistance are applied to the glass wool, which is flowing down in the hollow cylindrical bucket 10 that is rotating.

The angle $\theta$ of the lower stage part 12 is an angle, at which the center axis of the lower stage part 12 (the axis passing through the center of an upper end and the center of the lower end of the lower stage part 12) forms with the rotary axis L. The angle $\theta$ may be properly selected according to the width of the mat of fibers 6 accumulated on the collection conveyor, the rotating speed of the hollow cylindrical bucket 10, the length of the lower stage part 12, the amount of glass wool flowing down in the lower stage part 12, the distance between the hollow cylindrical bucket and the conveyor, the suction amount or the suction speed of the exhaust gas collection box under the conveyor or another factor. Normally, the angle $\theta$ preferably ranges 5° to 45°, more preferably ranges 10° to 40°, and particularly preferably ranges 15° to 30°. When the angle $\theta$ is less than 5°, there is a possibility that it is impossible to sufficiently disperse glass wool due to an insufficient centrifugal force and an insufficient resistance and to uniformly swing and distribute the glass wool in the entire width of the collection conveyor 7. On the other hand, when the angle $\theta$ is greater than 45°, there is a possibility that it is difficult to uniformly accumulate the glass wool on the conveyor since the centrifugal force is made stronger to swing the glass wool further toward outside so that the glass wool adheres to a side wall surface of the hood or is distributed so as to form much accumulation on both lateral end portions of the collection conveyor 7.

When the lower stage part 12 is formed in a tapered shape as in this embodiment, an angle $\alpha$ toward the center of rotation with respect to the rotary axis L differs from an angle $\beta$ toward outside the center of rotation with respect to the rotary axis L in such a way that the former angle is larger than the latter angle since the lower stage part 12 is inclined with respect to the rotary axis L. The angle $\alpha$ is important for ensuring a desired distribution of the mat of fibers 6 accumulated on the conveyor, and the angle $\beta$ is important for controlling the uniformity and the resistance of the above-mentioned fibrous material. As the difference between both angles $(\alpha-\beta)$ increases, the degree of taper increases. From the viewpoint of sufficiently obtaining the effect offered by the above-mentioned mentioned tapered shape, the value of "$\alpha-\beta$" preferably ranges from 5° to 30°, and more preferably ranges from 10° to 20°.

The upper end of the lower stage part 12 of the hollow cylindrical bucket 10 has a diameter A set to be preferably at least equal to the diameter B of the spinner 1, and more preferably larger than the diameter B of the spinner 1 by 1.1 times or above. In the hollow cylindrical bucket 10, the lower end of the upper stage part 13 and the upper end of the lower stage part 12 have the same diameter as each other. When the diameter A of the upper end of the lower stage part 12 is smaller than the diameter B of the spinner 1, it becomes difficult to smoothly and uniformly the glass wool into the lower stage part 12 since a portion of the glass wool fiberized by the spinner 1 and dropped in to the hollow cylindrical bucket 10 is more likely to collide with a lower portion of the upper stage part 13. Conversely, when the diameter A is set to be large, an adverse effect is given to the balance between the centrifugal force and the resistance applied to the glass wool to make uniform dispersion of the glass wool difficult and to make the apparatus larger, which leads to an increase in cost. From this point of view, it is preferred that the diameter B of the upper end of the lower stage part 12 be larger than the diameter B of the spinner 1 by about 1.5 times or below.

In the hollow cylindrical bucket 10, the lower end of the lower stage part 12 has a diameter D set to be preferably at least equal to the diameter B of the spinner 1 and more preferably larger than the diameter B of the spinner 1 by 1.1 times or above. When the diameter D of the lower end of the lower stage part 12 is smaller than the diameter B of the spinner 1, it becomes difficult to smoothly discharge the above-mentioned glass wool from the lower end of the bucket since a portion of the glass wool, which has been fiberized by the spinner and has been dropped into the hollow cylindrical bucket 10, is more likely to collide with a lower portion of the lower stage part 12. Conversely, when the diameter D of the lower end of the lower stage part 12 is too large, an adverse effect is given to the balance between the centrifugal force and the resistance applied to the glass wool to make uniform dispersion of the glass wool difficult and to make the apparatus larger, which leads to an increase in cost.

There is no limitation to the entire dimensions of the hollow cylindrical bucket 10 since the dimensions are determined according to the design of the distribution apparatus. However, the length (height H) of the lower stage part 12 is generally one of the elements affecting the centrifugal force applied to the glass wool along with the inclination angle θ. As the length of the lower stage part 12 increases, the centrifugal force increases. In the hollow cylindrical bucket according to this embodiment, the length H of the lower stage part 12 preferably ranges about 50 to 200 mm. When the length of the lower stage part is shorter than 50 mm, it is impossible to obtain a sufficient centrifugal force required for dispersion of the glass wool. When the length H of the lower stage part 12 is longer than 200 mm, the centrifugal force is made too strong, with the result that the glass wool is difficult to be uniformly dispersed from the opening of the lower stage part 12 without causing deviation.

In the present invention, the hollow cylindrical bucket 10 is disposed so as to be rotatable at the position just under the spinner 1 as stated above. The gear 16, which is formed in a ring shape by cutting a central portion thereof, is mounted to the mounting flange 17 of the hollow cylindrical bucket 10 as shown in FIG. 2, and the hollow cylindrical bucket 10 is mounted to a carriage 19 through a rotary bearing 18 at a portion thereof with the gear mounted thereto, the carriage being fixed to the hood 11 (see FIG. 1). By connecting the gear 16 to a driving motor 21 through, e.g., a gear 20 for drive, the hollow cylindrical bucket 10 is rotated by the driving motor 21. When the hollow cylindrical bucket 10 has a substantially central portion thereof in the height direction supported by the mounting flange 17 disposed at the connection part between the upper stage part 13 and the lower stage part 12 as in this embodiment, the hollow cylindrical bucket 10 can be rotated in an extremely stable manner. However, when the height dimension of the lower stage part 12 is smaller than the height dimension of the upper stage part 13, the hollow cylindrical bucket 10 may be supported at a higher position than the connection part between both stage parts.

In the present invention, it is preferred for the following reason that the hollow cylindrical bucket 10 and the spinner 1 be spaced from each other by a distance. The spinner 1 fiberizes molten glass in such a way that the molten glass, which has been projected from orifices in a lateral portion of the spinner 1 by a centrifugal force caused by fast rotation of the spinner 1, is blown off to be attenuated by compressed air issued from an air nozzle 15. Accordingly, when the spinner 1 and the hollow cylindrical bucket 10 are spaced from each other by at least a certain distance C, it is difficult to introduce the combustion gas and external air other than the compressed air from the air nozzle 15, in order to uniformly stabilize the flow of a veil of fiberized glass wool. As a result, there is a possibility that the quality of the glass wool is lowered. The provision of the spacing between the spinner 1 and the hollow cylindrical bucket 10 has another advantage of facilitating the operation for mounting and dismounting the hollow cylindrical bucket 10. From this point of view, the position just under the spinner 1 means an area positioned under and spaced from the spinner 1 by the distance C in the present invention.

The hollow cylindrical bucket 10 and the spinner 1 preferably have a ring-shaped member 14 disposed therebetween in order to stabilize air flows in the fiberizing unit and its periphery and to prevent the fiberized glass wool from being scattered. The ring-shaped member 14 comprises a metal ring having a heat resistance and a diameter set to be substantially equal to the diameter of the top end of the hollow cylindrical bucket 10. The height of the ring-shaped member may be properly determined according to the distance C between the hollow cylindrical bucket 10 and the spinner 1.

In the present invention, the hollow cylindrical bucket 10 has a rotating speed of preferably 10 to 120 rpm, more preferably 30 to 80 rpm, and further preferably 40 to 60 rpm. It is preferred that the rotating speed of the hollow cylindrical bucket 10 be optimally determined in any one of these ranges, considering the inclination angle θ of the lower stage part 12 of the hollow cylindrical bucket 10, the shape of the outer periphery of the lower stage part, the dispersion width of the glass wool, the distance between the hollow cylindrical bucket and the conveyor, the suction amount and the suction speed of exhaust gas collection box under the conveyor, and another factor. When the rotating speed is lower than 10 rpm, it is substantially impossible to obtain a sufficient centrifugal force required for uniformly dispersing the glass wool in a certain width. When the rotating speed is higher than 120 rpm, the centrifugal force becomes too stronger than the resistance applied to glass wool flowing down in the lower stage part 12 of the hollow cylindrical bucket 10, with the result that there is a possibility that the deviation in dispersion or the variation in dispersion is caused. By setting the rotating speed so as to be fitted to the hollow cylindrical bucket 10, an optimum centrifugal force and an optimum resistance are applied to the glass wool. Thus, the glass wool is uniformly dispersed by a combination of the centrifugal force and the resistance, and the glass wool can be accumulated or collected on the collecting conveyor. Further, since no compressed air is used for dispersing the glass wool, only a portion of the air blown off during fiberizing operation by the spinner is introduced, as a gas, into the hood along with the glass wool, with the result that it is possible to significantly reduce the amount of an exhaust gas to be cleaned up.

The present invention is applicable to collect fibrous material to produce a fibrous product for, e.g., a thermal insulation product or an acoustical insulation product. The present invention is particularly effective to collect short glass fibers (glass wool) in such a way that the short glass fibers are controllably dispersed in a uniform and constant thickness.

The entire disclosure of Japanese Patent Application No. 2006-166054 filed on Jun. 15, 2006 including specification, claims, drawings and summary are incorporated herein by reference in its entirety.

What is claimed is:

1. A method for distributing fibrous material, wherein fibrous material, which is fiberized by a spinner of a fiberizing unit, is accumulated on a collection conveyor disposed under the spinner, the method comprising:
rotatably disposing a hollow cylindrical bucket at a position under the spinner, the hollow cylindrical bucket having a two-stage structure comprising an upper stage part and a lower stage part, wherein the upper stage part has a center axis which is aligned with a rotary axis of the hollow cylindrical bucket and the lower stage part has a lower stage center axis which is inclined at an angle with respect to a rotary axis of the hollow cylindrical bucket; and
rotating the hollow cylindrical bucket, dispersing the fibrous material in the hollow cylindrical bucket and accumulating the fibrous material on the collection conveyor after flowing down the fibrous material in the hollow cylindrical bucket.

2. The method according to claim 1, wherein the fibrous material comprises glass wool having glass fibers.

3. The method according to claim 1, further comprising inclining the lower stage part of the hollow cylindrical bucket such that the lower stage center axis is at an angle of 5° to 45° with respect to the rotary axis.

4. The method according to claim 3, further comprising inclining the lower stage part of the hollow cylindrical bucket such that the lower stage center axis is at an angle of 10° to 40° with respect to the rotary axis.

5. The method according to claim 4, further comprising inclining the lower stage part of the hollow cylindrical bucket such that the lower stage center axis is at an angle of 15° to 30° with respect to the rotary axis.

6. The method according to claim 1, wherein the upper stage part has an outer periphery expanding toward an upper end thereof, and the lower stage part has an outer periphery formed in a tapered shape.

7. The method according to claim 1, wherein the lower stage part of the hollow cylindrical bucket has an upper end formed to have a diameter at least equal to a diameter of the spinner.

8. The method according to claim 1, further comprising disposing a ring-shape member between the hollow cylindrical bucket and the spinner.

9. The method according to claim 1, further comprising rotating the hollow cylindrical bucket at a rotating speed of 10 to 120 rpm.

10. The method according to claim 9, further comprising rotating the hollow cylindrical bucket at a rotating speed of 30 to 80 rpm.

11. The method according to claim 10, further comprising rotating the hollow cylindrical bucket at a rotating speed of 40 to 60 rpm.

* * * * *